(No Model.) 2 Sheets—Sheet 2.

B. C. WHELAN.
LOW PRESSURE ALARM.

No. 532,224. Patented Jan. 8, 1895.

Witnesses.

Inventor
Benjamin C. Whelan
by Wm. M. Monroe
Attorney

UNITED STATES PATENT OFFICE.

BENJAMIN C. WHELAN, OF CLEVELAND, OHIO, ASSIGNOR OF ONE-HALF TO ADELBERT R. GIBSON, OF SAME PLACE.

LOW-PRESSURE ALARM.

SPECIFICATION forming part of Letters Patent No. 532,224, dated January 8, 1895.

Application filed June 5, 1894. Serial No. 513,521. (No model.)

*To all whom it may concern:*

Be it known that I, BENJAMIN C. WHELAN, a citizen of the United States, and a resident of Cleveland, county of Cuyahoga, State of Ohio, have invented certain new and useful Improvements in Alarm Detectives for Air-Pumps, of which I hereby declare the following to be a full, clear, and exact description, such as will enable others skilled in the art to which the invention appertains to make and use the same.

This invention relates to alarm-detectors for air pumps of railway air brake systems.

The main and primary object of the present invention is to provide an air pump detector of the character noted that shall insure against accidents resulting from the loss of air pressure in the reservoir and the train line of air brake systems on railway trains, which is ordinarily caused by a stoppage of the pump or excessive leakage in some part of the system.

To this end, the invention contemplates an automatically operated alarm device that provides automatic means for notifying the engineer when the air pressure in the reservoir is reduced by the accidental stoppage of the pump, or leakage in the line of train pipe, to a point below the required working pressure, or the limit of safety for operating the brakes. In the attainment of these objects the invention also contemplates means wherein the device is adapted to operate automatically at any predetermined safety limit of pressure, and furthermore to provide means whereby the sounding of the alarm is prevented until the requisite working pressure of air is obtained.

Ordinarily an engineer depends upon the usual pressure gage placed in the cab of the locomotive to indicate the pressure of air in the reservoir and the train line of the system, and ordinarily the multiplicity of duties of the engineer frequently occupy his time to such a degree as to prevent him noticing the gage, and therefore very often the engineer is unaware of a low pressure in the reservoir or line of piping. The present invention obviates these difficulties by providing a signal that automatically operates and sounds an alarm when the pressure of air becomes low either through the stoppage of the air pump or an excessive leakage.

With these and other objects in view, which will readily appear as the nature of the invention is better understood, the same consists in the novel construction, combination and arrangement of parts hereinafter more fully described, illustrated and claimed.

Figure 1:
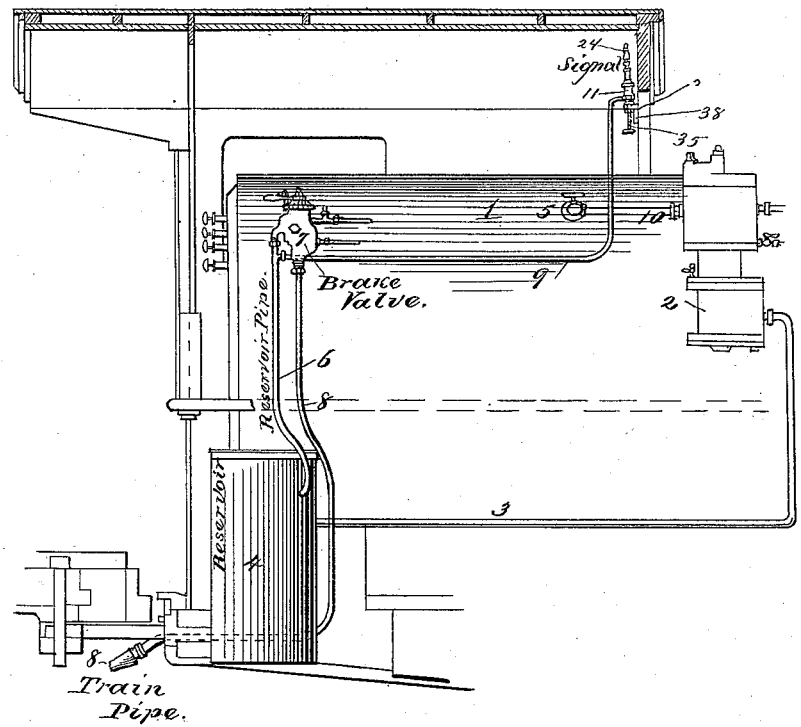
Figure 2:
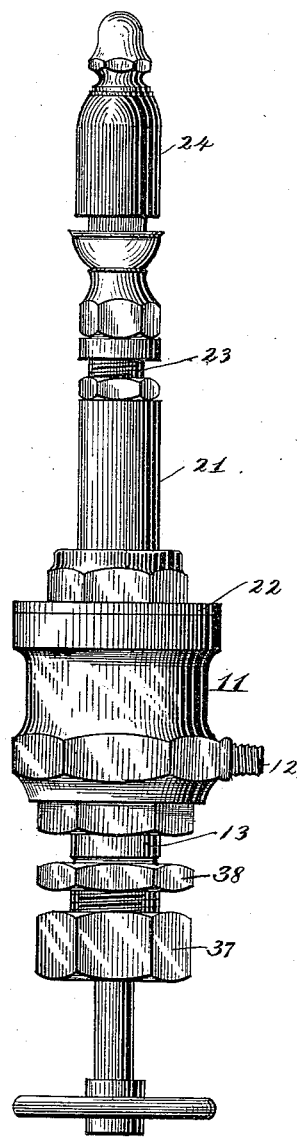
Figure 3:
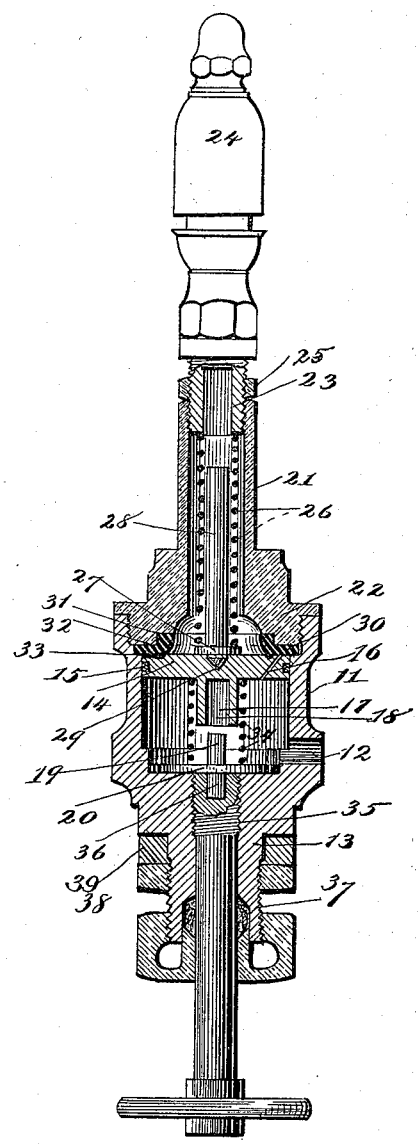

In the accompanying drawings: Figure 1 is a sectional view of an engine cab showing in elevation the general arrangement of the air brake apparatus therein and the connection of the herein described detector device therewith. Fig. 2 is a side elevation of an air pump detector constructed in accordance with this invention. Fig. 3 is a central longitudinal sectional view thereof.

Referring to the accompanying drawings, 1 designates that end of an ordinary locomotive boiler over which is arranged the usual engine cab, and at one side of the boiler in the customary position is located the air pump 2, from which leads the pipe 3, connected to the reservoir 4. The reservoir 4, has connected thereto the usual reservoir pipe 6, that is connected to the engineer's brake valve 7, to which valve is also connected the train pipe 8, while the reservoir pipe 6, has connected thereto the detector or alarm pipe 9, that leads to and connects with the detector to be described. The air pump 2, has connected thereto the steam pipe 10, which is provided with the usual steam valve 5. The detector or alarm pipe 9, leads from the reservoir pipe 6 to a point within the front part of the engine cab and is fitted to the inlet nozzle 12 of a cylindrical casing 11. The cylindrical casing 11 is preferably arranged in an upright position and is provided at its lower end with the cylindrical extension neck 13, and is interiorly threaded at its upper end to receive therein the cap nut or head 22, which nut or head 22, is provided with an elongated tubular neck 21, interiorly threaded at its upper end to adjustably receive therein the exteriorly threaded stem or nozzle 23, of a metallic air whistle 24. The nozzle 23 provides means for detachably securing the air whistle 24 in position and is also adjustable in the neck 21, and is locked in its adjusted position by means of a lock-nut 25 working thereon and against the upper end of the neck 21. The inner end of the adjustable nozzle 23 bears on the upper end of the valve spring 26.

The valve spring 26 is arranged inside of the tubular neck 21, and is arranged to bear at its lower end on the flange 27 of the core-stem 28, arranged within the said spring 26. The said core-stem 28 is provided with a lower pointed end disposed just below the flange 27, and loosely has a bearing in the central bearing recess or socket 29, formed centrally in the upper side of the piston valve 14, that is arranged to work within the cylindrical casing 11, below the cap nut or head 22.

The piston valve 14, snugly works within the cylindrical casing 11, and has a loose connection with the lower end of the stem 28, in order that the same may freely work within such casing. The piston valve 14 is provided in its periphery with a packing ring 15, that makes an air tight joint with the inner sides of the casing and near its periphery the said piston valve is provided with an air port or perforation 16, that provides communication between the interior of the cylindrical casing below the piston valve and the air whistle 24. The piston valve 14, when in its closed position, rests against the rubber gasket or valve seat 30, that is secured in position between the upper end of the cylindrical casing 11 and the lower side of the cap nut or head 22, and the said gasket or valve seat is provided with separate right angularly disposed shouldered seats 31 and 32, formed in the lower side of said cap nut or head to provide for securely positioning the rubber gasket or valve seat for the air-tight connection of the piston valve therewith. The said rubber gasket or valve seat is provided with an annular projection 33 that bears directly on the shoulder within the upper threaded end of the cylindrical casing to receive the cap nut or head 22, thereon to provide for securely clamping the said gasket or valve seat in position. When the piston valve 14 is closed tight against the seat 30, it will be obvious that the air port or perforation 16, will be covered and communication cut off from below the piston valve.

The piston valve 14 is provided on its lower side with a central downwardly projecting neck 17, that is bored out as at 18 to register with the upper short stem 19, of the clamp disk 20, that works within the lower end of the cylindrical casing 11, and is also provided directly opposite the upper short stem 19 with a corresponding lower stem 36, that loosely and removably fits in the upper socketed end of the screw stem 35, that is adjustably mounted within the interiorly threaded lower extension neck 13 of the casing, and said screw stem 35 is provided with an ordinary hand wheel for manipulating the same as illustrated in the drawings. The screw stem 35 works through a packing box 37 fitted on the lower end of the neck 13, and secured tightly in its adjusted position by means of the jam-nut 38 that is adapted to be screwed down onto the same as illustrated in the drawings.

An extra washer 39, is shown in Fig. 3, of the drawings as being mounted on the neck 13, above the nut 38.

The clamp disk 20, supports thereon the lower end of the supporting spring 34, that serves to hold the clamp disk 20 positively positioned on the upper end of the screw stem 35, and also serves to sustain the piston valve 14 to prevent its falling to the bottom of the cylinder, it of course being understood that the spring is of such a tension as to not interfere in the slightest degree with the working of the valve 14, when the pressure of the air may have become reduced by reason of the stoppage of the pump or leakage in some of the pipes of the system.

From the above it is thought that the construction of the herein described air pump detector will be readily understood, and relative to the operation of the device it is to be noted, that when the air pump is first started up the screw stem 35 is adjusted to carry the clamp disk 20 up against the lower end of the valve neck 17 to provide for positively clamping the piston valve 14 in its closed position against the rubber gasket or valve seat, until the air has reached a sufficient predetermined pressure within the casing to hold or support the piston valve 14 in its closed position against its seat.

The pressure at which the detector may be set to give a signal or alarm is regulated by adjusting the whistle stem or nozzle 23 on the upper end of the spring 26, whereby the tension of said spring may be adjusted to provide for opening the valve 14 when the pressure below the same has been reduced to any predetermined degree.

It will be understood that in operation, the air is introduced into the casing 11 directly from the reservoir pipe so that the air will be at the same pressure within the said casing as it is within the reservoir. After the air has reached the working pressure and will therefore support the valve 14 against its seat, the separate closing device for the valve consisting of the screw stem 35 and the clamp disk 20, is lowered away from the same. It will now be understood that when the pressure of air becomes reduced within the reservoir for either of the reasons stated, to a point below the desired limit, the piston valve 14 will be moved away from its seat by the tension of the spring 26, thereby uncovering the air port 16 so that the air will pass up through the neck 21 into the whistle 24 and sound an alarm until the engineer arrests the device, after having again started up the pump or stopped the leakage which caused the reduction in pressure.

The advantages of the device described will be obvious to those skilled in the art, especially as compared with the ordinary unreliable pressure or air gages heretofore employed, and it will be understood that changes in the form, proportion and the minor details of construction may be resorted to without departing from the principle or sacrificing any of the advantages of this invention.

Having thus described the invention, what is claimed, and desired to be secured by Letters Patent, is—

1. In an air pump detector, a casing adapted to be connected with one of the pipes of an air brake system and provided with a valve seat, a normally working valve working at one side of said valve seat, an air whistle connected with said casing, and a valve closing device for temporarily holding the valve closed against its seat until a working pressure of air exists within the casing, substantially as set forth.

2. In an air pump detector, the combination of a casing adapted to be connected with the reservoir pipe of an air brake system, an air whistle connected with said casing, a normally spring-opened valve working within said casing, and a valve closing device adapted to work directly against the valve for temporarily closing the same on its seat until a pressure of air is reached within the casing sufficient to close the valve on its seat against the tension of its spring, substantially as set forth.

3. In an air pump detector, the combination of a cylindrial valve casing provided with an air inlet at one end and interiorly threaded at its opposite end, a cap nut or head fitted in the threaded end of said casing and provided with right-angularly disposed shouldered seats in its inner side, and with an outer tubular elongated neck interiorly threaded at its outer end, a rubber gasket fitted in the shouldered seats of said nut or head and clamped between the same and one end of the casing, a piston valve working within the said casing and provided with an air port or perforation adapted to be closed by said gasket or valve seat, a valve spring arranged within the tubular neck against the piston valve to open the same when the air pressure falls below the normal, and an air whistle provided with an exteriorly threaded stem or nozzle adjustably working in the outer end of said tubular neck against the valve spring, substantially as set forth.

4. In an air pump detector, the combination of a cylindrical casing provided with an inlet nozzle adapted to connect with a reservoir pipe, an interior valve seat, and a tubular neck leading from said valve seat, an air whistle having a stem adjustably fitted in said neck, a piston valve working within said casing and provided with an air port or perforation near its periphery and with a central bearing recess or socket in one side, a core-stem arranged within said tubular neck and provided with a pointed end bearing in the recess or socket of said valve and with a flange near such end, and a valve spring arranged on said core-stem and bearing at one end against the flange thereof and at its opposite end against the stem of said air whistle, substantially as set forth.

5. In an air pump detector, a cylindrical casing provided with an interior valve seat and a tubular neck leading off from said seat, an air whistle connected with said neck, a piston valve working within said casing against said seat, a valve-opening spring arranged at one side of said piston valve and a hand adjusted stem mounted within one end of the casing and adapted to work against said piston valve on the opposite side from the spring to temporarily close the valve on its seat, substantially as set forth.

6. In an air pump detector, the combination of a cylindrical casing provided with an interior valve seat and an interiorly threaded extension neck at one end, an air whistle connected with the casing at one side of the valve seat, a piston valve working within the casing against said seat and provided with an air port and a neck projected centrally from one side, a screw stem adjustably mounted in the interiorly threaded extension neck of the casing and provided with a socketed inner end, and a clamp disk arranged on the inner end of said stem and provided with opposite short stems, one of which fits in the socket of the screw stem, and the other of which works into the neck of the piston valve, substantially as set forth.

BENJAMIN C. WHELAN.

Witnesses:
WM. M. MONROE,
GEO. O. WILLET.